(12) United States Patent  
Ji

(10) Patent No.: US 9,323,545 B2  
(45) Date of Patent: Apr. 26, 2016

(54) METHOD, SYSTEM, MODULE, AND STORAGE MEDIUM FOR AUTOMATIC ADAPTATION OF HARDWARE ENCODING AND DECODING

(71) Applicant: Tencent Technology (Shenzhen) Company Limited, Shenzhen (CN)

(72) Inventor: Xiaocui Ji, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/591,308

(22) Filed: Jan. 7, 2015

(65) Prior Publication Data

US 2015/0128155 A1   May 7, 2015

Related U.S. Application Data

(63) Continuation of application No. PCT/CN2013/082673, filed on Aug. 30, 2013.

(30) Foreign Application Priority Data

Sep. 6, 2012   (CN) .......................... 2012 1 0327240

(51) Int. Cl.
*G06F 13/00* (2006.01)
*G06F 9/445* (2006.01)
(Continued)

(52) U.S. Cl.
CPC ............ *G06F 9/44526* (2013.01); *H04N 19/10* (2014.11); *H04N 19/12* (2014.11); *H04N 19/42* (2014.11)

(58) Field of Classification Search
CPC .................................................. G06F 9/4411
USPC ................................................ 719/321, 327
See application file for complete search history.

(56) References Cited

U.S. PATENT DOCUMENTS

| 8,640,097 B2 * | 1/2014 | Khouzam et al. ............. 717/121 |
| 2002/0007357 A1 | 1/2002 | Wong et al. |

(Continued)

FOREIGN PATENT DOCUMENTS

| CN | 101047842 A | 10/2007 |
| CN | 101258723 A | 9/2008 |

(Continued)

OTHER PUBLICATIONS

ISR and Written Opinion to PCT International Application No. PCT/CN2013/082673, dated Dec. 12, 2013, (16p).

(Continued)

*Primary Examiner* — Andy Ho
(74) *Attorney, Agent, or Firm* — Brinks Gilson & Lione

(57) ABSTRACT

This present disclosure provides a method, system, module, and storage medium for automatic adaptation of hardware encoding and decoding, wherein the method calls a hardware codec of an embedded device to perform encoding and decoding, including the following steps: pre-storing at least one encoding and decoding plugin each of which corresponds to a hardware codec and complies with a pre-defined interface; importing the encoding and decoding plugin and loading the corresponding hardware codec; and encoding or decoding corresponding data. By dynamically loading the plugin, the prevent disclosure solves the problem that the management on different platforms are complex and the compatibilities of different platforms are poor; furthermore, the prevent disclosure improves the encoding and decoding capability of the system and further improves the video quality by reasonably scheduling the hardware codec of the embedded chip.

15 Claims, 8 Drawing Sheets

(51) Int. Cl.
*H04N 19/10* (2014.01)
*H04N 19/12* (2014.01)
*H04N 19/42* (2014.01)

(56) References Cited

U.S. PATENT DOCUMENTS

| | | | |
|---|---|---|---|
| 2002/0120945 A1 | 8/2002 | Schwalb | |
| 2007/0260616 A1* | 11/2007 | Shen | 707/100 |
| 2011/0119585 A1* | 5/2011 | Kim | 715/719 |
| 2011/0142121 A1 | 6/2011 | Hayden et al. | |

FOREIGN PATENT DOCUMENTS

| | | |
|---|---|---|
| CN | 101771869 A | 12/2008 |
| CN | 101339789 A | 1/2009 |
| CN | 101720036 A | 6/2010 |
| CN | 101202919 B | 5/2011 |
| CN | 102186054 A | 9/2011 |
| WO | WO2011/050632 A1 | 5/2011 |

OTHER PUBLICATIONS

First Office Action to Chinese Patent Application No. 201210327240.3, dated Sep. 14, 2015 and Concise Explanation of Relevance for Office Action in English, (13p).

Office Action dated Feb. 2, 2016 for corresponding Chinese Patent Application No. 201210327240.3, 12 pages.

* cited by examiner

METHOD, SYSTEM, MODULE, AND STORAGE MEDIUM FOR AUTOMATIC ADAPTATION OF HARDWARE ENCODING AND DECODING

CROSS-REFERENCE TO RELATED APPLICATIONS

This application is a continuation of International Application No. PCT/CN2013/082673, filed on Aug. 30, 2013, which claims priority to Chinese Patent Application No. 201210327240.3, entitled "Method, system, and module for automatic adaptation of hardware encoding and decoding," filed on Sep. 6, 2012, both of which are hereby incorporated by reference in their entireties.

FIELD

The present disclosure relates to computer technologies, and more particularly, to a method, system, and storage medium for automatic adaptation of hardware codec.

BACKGROUND

With the continuous development of embedded devices in recent years and the popularity of embedded systems in devices such as mobile phones, Personal Digital Assistants (PDAs), and mobile televisions, developments of applications in mobile devices are correspondingly increased. Due to reasons that the software development project gets larger or the software research and development is urgent and reasons that hardware devices of different embedded platforms are different from each other, a lot of people are required to cooperate to develop and design the software and seamless integrate software code written by different people.

With the popularity of video communication, it becomes more frequent to perform encoding and decoding of video data in a mobile device. In the process of encoding and decoding the video data, due to the complexity of the video encoding and decoding algorithm, it often needs to take much CPU. However, in view of the fact that many embedded system chips are integrated with hardware codecs, the video quality can be greatly improved if the advantages of the system chips can be successfully used to improve the software encoding and decoding performance.

Since hardware encoding and decoding interfaces provided by different manufacturers are different from each other, a software interface is used when the hardware codec on the system chip is called such that the hardware codec can be called by an application. At present, the software interface is generally implemented by using a source code integration method. However, in this method, different source code needs to be encoded for different hardware codecs, furthermore, since the performance of each platform is different, a new software needs to be published each time when the source code is integrated and maintained, which increases the amount of work and goes against the maintenance of the system.

As mentioned above, the encoding and decoding method of the present embedded device has the following shortcomings: first, great amount of work; in different devices, different software interfaces are needed, different source code needs to be maintained, and a recompilation is required at each publication of the software, which increases the amount of work; second, reliance on the hardware device; models of various hardware devices provided by different manufacturers are different from each other, thus, when the hardware codec is used, it often needs to detect the hardware device to allow encoding parameters to match with decoding parameters, which causes overreliance on the hardware device.

SUMMARY

An object of the present disclosure is to provide a method, system, module, and storage medium for automatic adaptation of hardware encoding and decoding, to overcome the problem that the work amount of the encoding and decoding method of the conventional embedded device is great, and to overcome the problem that the encoding and decoding method of the conventional embedded device relies too much on the hardware device.

In a first aspect, the present disclosure provides a method for automatic adaptation of hardware encoding and decoding which uses hardware codec of an embedded device to perform encoding and decoding. The method including the following steps: pre-storing at least one encoding and decoding plugin each of which corresponds to a hardware codec and complies with a pre-defined interface; importing the encoding and decoding plugin and loading the corresponding hardware codec; and encoding or decoding corresponding data.

In a second aspect, the prevent disclosure further provides a video communication encoding and decoding method which uses hardware codec of an embedded device to perform encoding and decoding. The method includes the following steps: pre-storing at least one encoding and decoding plugin each of which corresponds to a hardware codec and complies with a pre-defined interface; scanning the pre-stored encoding and decoding plugin and obtaining a capability value of the hardware codec corresponding to the encoding and decoding plugin according to a plugin interface; exchanging and comparing capability values of the hardware codecs of both communication sides; importing the needed encoding and decoding plugins according to the comparison result and loading the corresponding hardware codecs of both communication sides; and encoding or decoding corresponding data.

In a third aspect, the present disclosure further provides a system for automatic adaptation of hardware encoding and decoding which uses hardware codec of an embedded device to perform encoding and decoding, including: a hardware codec integrated in an embedded chip; a storage unit configured to store at least one encoding and decoding plugin each of which corresponds to a hardware codec and complies with a pre-defined interface; and a main program module configured to import the encoding and decoding plugin, load the corresponding hardware codec, and encode or decode corresponding data.

In a fourth aspect, the present disclosure further provides a video communication encoding and decoding system which uses hardware codec of an embedded device to perform encoding and decoding, including: at least two systems for automatic adaptation of hardware encoding and decoding connected together via a wired or wireless network, each of the systems including: a hardware codec integrated in an embedded chip; a storage unit configured to store at least one encoding and decoding plugin each of which corresponds to a hardware codec and complies with a pre-defined interface; and a main program module configured to import the encoding and decoding plugin, load the corresponding hardware codec, and encode or decode corresponding data.

In a fifth aspect, the present disclosure further provides a hardware codec calling module, including: a storage unit configured to store at least one of the encoding and decoding plugin each of which corresponds to a hardware codec and complies with a pre-defined interface; and a main program module configured to import the encoding and decoding plugin and load the corresponding hardware codec.

In a sixth aspect, the present disclosure further provides one or more storage media which have computer executable instructions configured to implement a method for automatic adaptation of hardware encoding and decoding and call a hardware codec of an embedded device to perform encoding and decoding, wherein the method for automatic adaptation of hardware encoding and decoding includes the following steps: pre-storing at least one encoding and decoding plugin each of which corresponds to a hardware codec and complies with a pre-defined interface; importing the encoding and decoding plugin and loading the corresponding hardware codec; and encoding or decoding corresponding data.

Compared with the prior art, the present disclosure includes advantages as follows: by dynamically loading the plugin, the present disclosure replaces the conventional method of calling the hardware codec by compiling the source code and solves the problem that the management on different platforms are complex and the compatibilities of different platforms are poor; furthermore, the prevent disclosure improves the encoding and decoding capability of the system and further improves the video quality by reasonably scheduling the hardware codec of the embedded chip.

The above description is only a summary of the technical solutions of the present disclosure. In order to better understand the technical method of the present disclosure, to implement it according to the content of the specification, and to make the above and other objects, features, and advantages of the present disclosure more easily understood, specific embodiments are described in detail below in connection with the accompanying drawings.

BRIEF DESCRIPTION OF THE DRAWINGS

To explain the technical solutions of the embodiments of the present disclosure, accompanying drawings used in the embodiments are followed. Apparently, the following drawings merely illustrate some embodiments of the disclosure, but for persons skilled in the art, other drawings can be obtained without creative works according to these drawings.

DETAILED DESCRIPTION OF THE DRAWINGS

In order to further illustrate technical method taken for achieving the intended purpose of the present disclosure and to illustrate advantages of the present technical method, embodiments, methods, steps, and advantages of a method and system for automatic adaptation of hardware encoding and decoding, and those of a video communication encoding and decoding method, are described in more detail below with reference to the accompanying drawings and the preferred embodiments.

What's mentioned above and other technical method, features, and advantages of the present disclosure will become clearer in the specific description of the preferred embodiments combined with the accompanying drawings. By way of the embodiments, the technical means taken for achieving the intended purpose of the present disclosure and the advantages thereof can be understood in a more in-depth and detailed way, however, it will be appreciated that the accompanying drawings are only for reference and illustration and are not intended to limit the present disclosure.

An object of the present disclosure is to provide a method of dynamically loading a hardware encoding and decoding plugin, thereby overcoming the shortcoming that the amount of the work of the conventional source code integration method is large.

Figure 1:
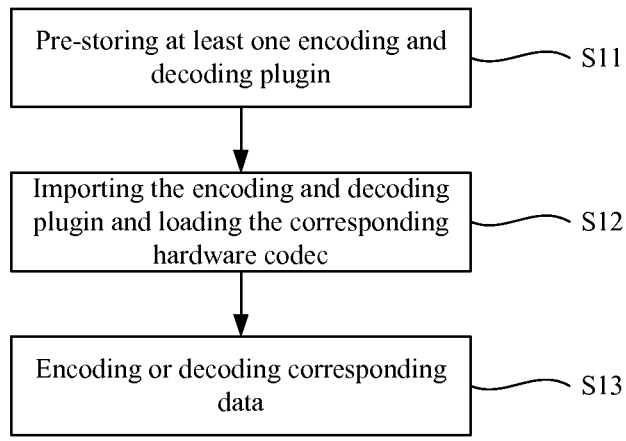
FIG. 1 is a flow chart illustrating a method for automatic adaptation of hardware encoding and decoding in accordance with an embodiment of the present disclosure.

Referring to FIG. 1, which is a flow chart illustrating a method for automatic adaptation of hardware encoding and decoding in accordance with an embodiment of the present disclosure, the method is configured to call a hardware codec of an embedded device to perform encoding and decoding and includes steps as follows.

S11, pre-storing at least one encoding and decoding plugin.

A plugin is a program written complying with unified pre-defined interface specifications. An application calls the plugin via the interface specifications when the application is running, thereby expanding the function of the application.

In the present disclosure, each encoding and decoding plugin complies with a pre-defined interface such that the encoding and decoding plugin can be called by a main program. The main program can load the hardware codec in a corresponding embedded chip by importing the corresponding encoding and decoding plugin.

It is to be noted that, by importing the encoding and decoding plugin and calling the corresponding codec by the main program, the device can only perform encoding or decoding according to requirements, or, the device can perform both encoding and decoding in this order. In addition, since a plurality of hardware codecs may simultaneously exist (for example, a plurality of embedded chips may be integrated in a device and each chip is provided with a hardware codec), a plurality of encoding and decoding plugins may be pre-stored; however, only one encoding and decoding plugin is imported when the encoding or decoding is being performed, that is, only one single hardware codec performs encoding and decoding at one time; only after the current encoding or decoding operation is finished, can another encoding and decoding plugin be imported. If the communication counterpart is a different communication terminal, different hardware codecs are imported according to the adaptation situation of the codec.

S12, importing the encoding and decoding plugin and loading the corresponding hardware codec.

S13, encoding or decoding corresponding data.

Figure 2:
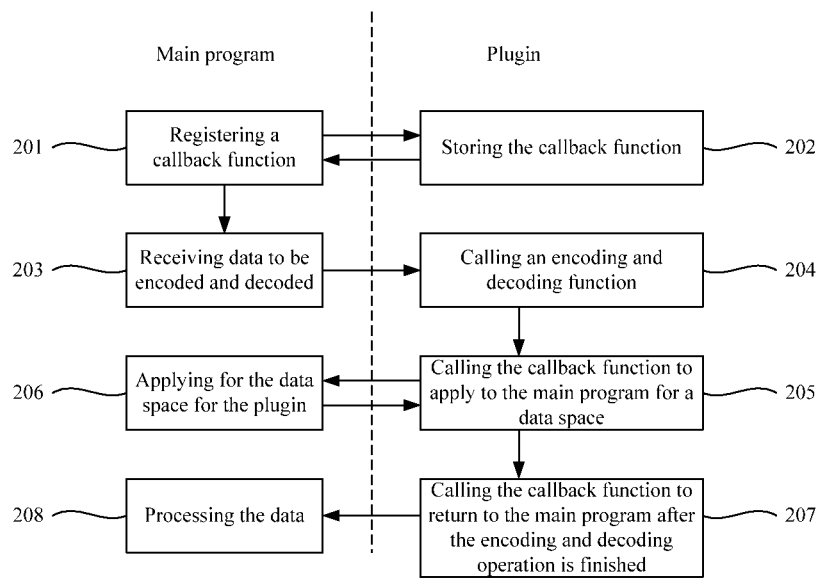
FIG. 2 is a schematic view showing data input and output interactions between an encoding and decoding plugin and a main program.

The data input and output interactions between the encoding and decoding plugin and the main program can be implemented by a callback function. The callback is a bidirectional call mode, that is, a called party can call the interface of the counterpart when the interface thereof is being called. Therefore, the input and output of the hardware codec can be synchronized via the callback function. The data input and output interactions between the encoding and decoding plugin and the main program are as shown in FIG. 2.

S201, the main program registers the callback function to the encoding and decoding plugin via a defined interface.

S202, the encoding and decoding plugin stores an address of the callback function which is configured to realize the callback after the encoding and decoding operation is finished.

S203, the main program obtains the data to be encoded and decoded and jumps to the encoding and decoding plugin by calling in interface function.

S204, the encoding and decoding plugin calls the encoding and decoding function.

S205, if a data space is required by the encoding and decoding operation, the encoding and decoding plugin calls the callback function and applies to the main program for the data space.

S206, the main program applies for the data space for the encoding and decoding plugin.

S207, the encoding and decoding plugin calls the callback function to return to the main program after the encoding and decoding operation is finished.

S208, the main program processes data and displays or transmits the data.

Figure 3:
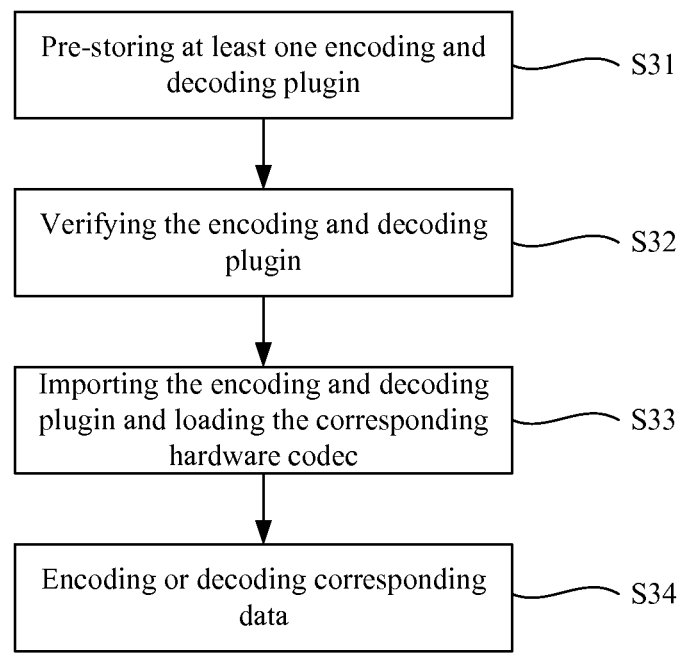
FIG. 3 is a flow chart illustrating another method for automatic adaptation of hardware encoding and decoding in accordance with an embodiment of the present disclosure.

Referring to FIG. 3, which is a flow chart illustrating another method for automatic adaptation of hardware encoding and decoding in accordance with an embodiment of the present disclosure, the method includes the following steps:

S31, pre-storing at least one encoding and decoding plugin each of which corresponds to one hardware codec and complies with a pre-defined interface; and S32, verifying the encoding and decoding plugin.

Figure 4:
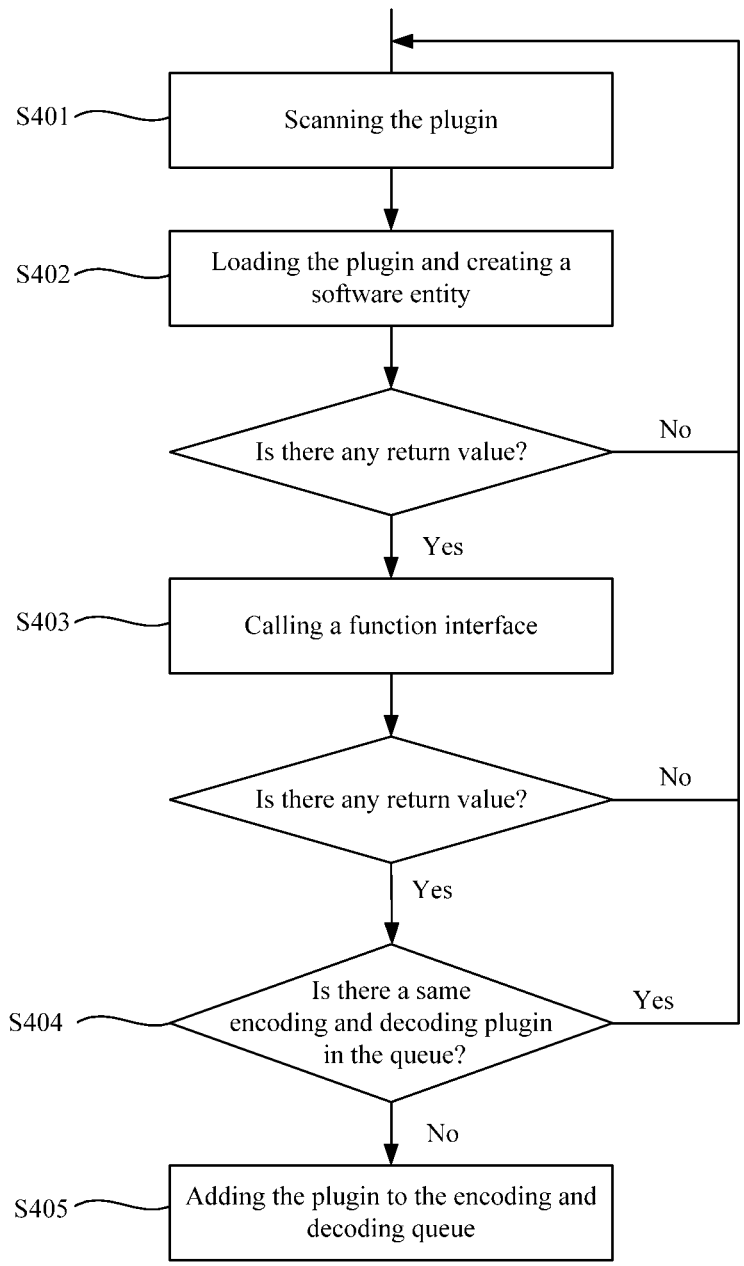
FIG. 4 is a schematic view showing the process of verifying the encoding and decoding plugin.

Sometimes due to the reasons such as that the version of the plugin has been updated, the hardware codec corresponding to a certain encoding and decoding plugin may not be found, therefore, it is necessary to verify the plugin; as shown in FIG. 4, the verification process can include steps as follows.

S401, scanning the plugin.

S402, loading the plugin and creating a software entity. Creating the software entity means building a model that the main program imports the encoding and decoding plugin, thereby detecting whether the pre-defined interface of the plugin matches with the main program and the hardware codec. Failure of creating the software entity indicates that the verification of the plugin fails and thus the plugin cannot be imported by the main program.

S403, calling a function interface. Failure of calling the function interface also indicates that the verification of the plugin fails and the plugin cannot be imported by the main program.

S404, judging whether the scanned plugin has already existed. If a single device includes more than two codecs of the same type, the plugin only needs to be imported at the first time when being scanned. Therefore, if the scanned plugin has already existed, the verification of the plugin fails.

S405, adding the plugin to an encoding and decoding queue.

It is to be noted that the verification of the encoding and decoding plugin can be implemented in one or several ways of the three ways including creating the software entity, calling the function interface, and judging whether the scanned plugin has already existed according to actual requirements.

S33, importing the encoding and decoding plugin and loading the corresponding hardware codec. After the verification of the plugin is finished, the corresponding hardware codec can be loaded by importing the plugin.

S34, encoding or decoding corresponding data.

Figure 5:
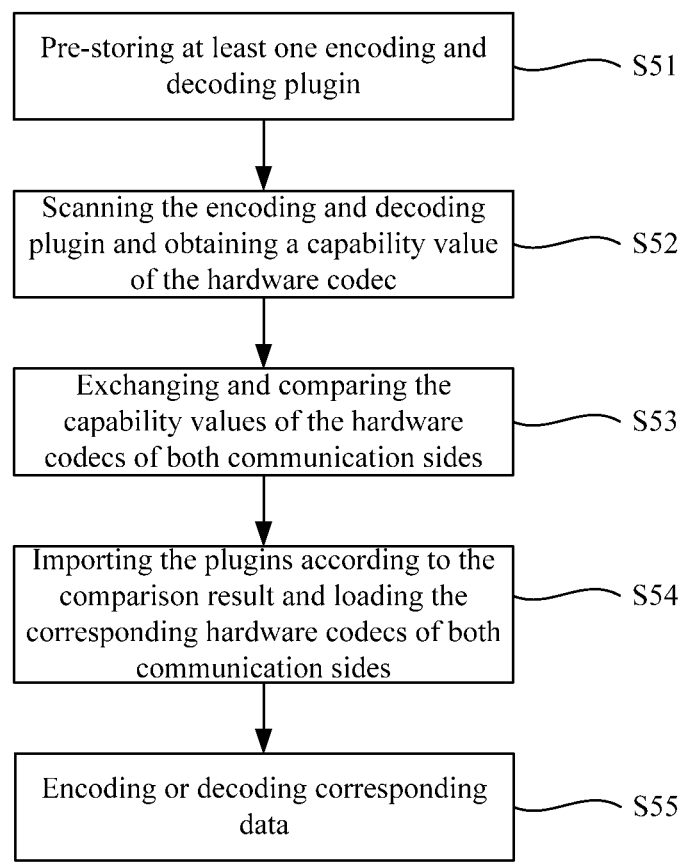
FIG. 5 is a flow chart illustrating a video communication encoding and decoding method in accordance with an embodiment of the present disclosure.

By dynamically loading the encoding and decoding plugin, the hardware codec in the embedded chip can be reasonably scheduled to improve the encoding and decoding capability of the system. Of course, the spirit of dynamically loading the encoding and decoding plugin can be applied in a single device for encoding and decoding the data or the video communication between two devices. Thus, the present disclosure provides a video communication encoding and decoding method configured to use the hardware codec of an embedded device for performing encoding and decoding, as shown in FIG. 5, the method includes steps as follows.

S51, pre-storing at least one encoding and decoding plugin each of which corresponds to a hardware codec and complies with a pre-defined interface.

S52, scanning the pre-stored encoding and decoding plugin and obtaining a capability value of the hardware codec corresponding to the encoding and decoding plugin according to an interface of the plugin.

The capability value of the codec mentioned herein interprets the function of the codec, thus parameters of the capability value can indicate the function of the codec and the matched parameters. The parameters include: maximum image resolution supported by the codec, output maximum bit rate, frame rate, type of the input image supported by the codec, type of the output image, and type of the codec (such as VP8 or H264).

Since the encoding and decoding plugin corresponding to the hardware codec is provided by the manufacturer, therefore, the capability value of each hardware codec of the hardware platform can be obtained via the defined interface of the plugin, and then the parameters of the capability value of the hardware codecs can be managed in a queue for matching the codecs of both communication sides in the following procedure.

S53, exchanging and comparing the capability values of the hardware codecs of both communication sides.

S54, importing the needed encoding and decoding plugins according to the comparison result and loading the corresponding hardware codecs of both communication sides.

The object of exchanging and comparing the capability values of the hardware codecs is to find two hardware codecs having same parameters, that is, to allow parameters such as the encoding and decoding amount that the hardware codecs of both communication sides can process and code rates of the hardware codecs of both communication sides match with each other, thereby allowing for the smooth implementation of the video communication. If there is a plurality of groups of matched hardware codecs in both communication sides, a priority value can be set to each hardware codec to select the required hardware codec to be finally loaded.

S55, encoding or decoding corresponding data.

Figure 6:
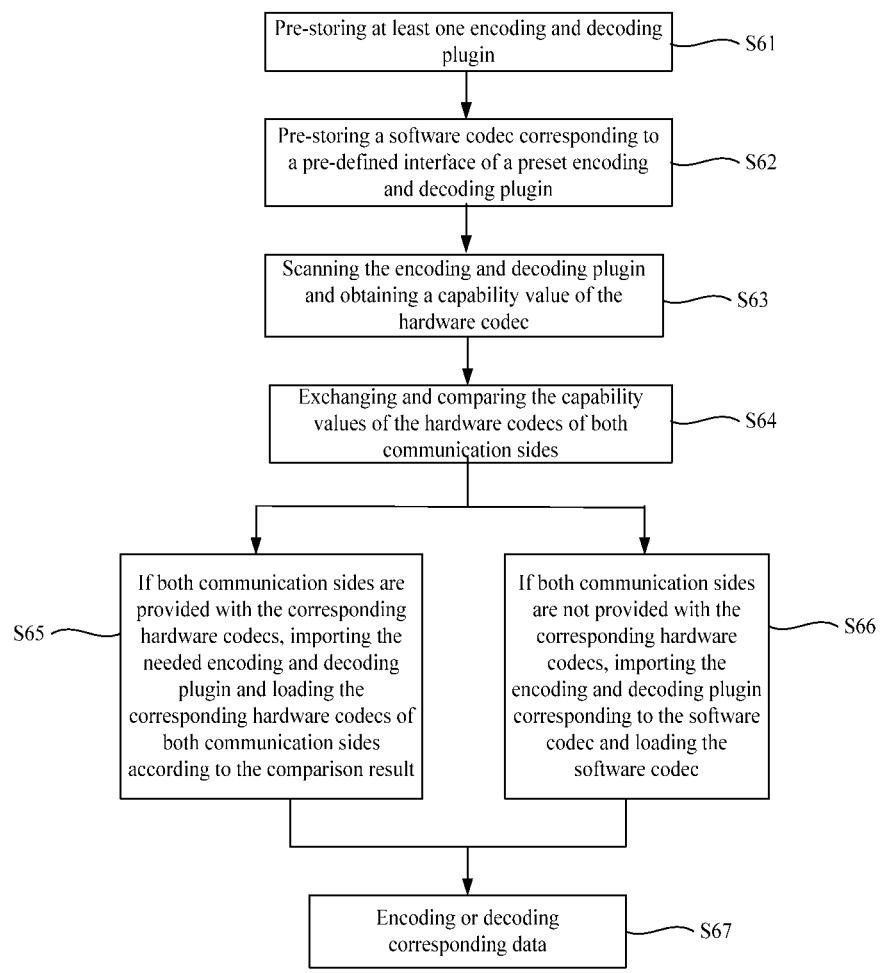
FIG. 6 is a flow chart illustrating another video communication encoding and decoding method in accordance with an embodiment of the present disclosure.

Referring to FIG. 6, which is a flow chart illustrating another video communication encoding and decoding method in accordance with an embodiment of the present disclosure, the method is configured to call a hardware codec of an embedded device for performing encoding and decoding, the method includes steps as follows.

S61, pre-storing at least one encoding and decoding plugin each of which corresponds to a hardware codec and complies with a pre-defined interface.

S62, presetting a software codec corresponding to a preset encoding and decoding plugin. The encoding and decoding plugin of the software codec has the same interface as that of the encoding and decoding plugin of the hardware codec, thus, the encoding and decoding plugin of the software codec is also imported according to conditions and can be seamlessly connected to the main program.

S63, scanning the pre-stored encoding and decoding plugin and obtaining a capability value of the hardware codec corresponding to the encoding and decoding plugin according to an interface of the plugin.

S64, exchanging and comparing the capability values of the hardware codecs of both communication sides.

S65, if both communication sides are provided with corresponding hardware codecs, importing the required encoding and decoding plugins according to the comparison result and loading the corresponding hardware codecs of both communication sides.

S66, if both communication sides are not provided with corresponding hardware codecs, importing the encoding and decoding plugin corresponding to the software codec and loading the software codec.

S67, encoding or decoding corresponding data.

Figure 12:
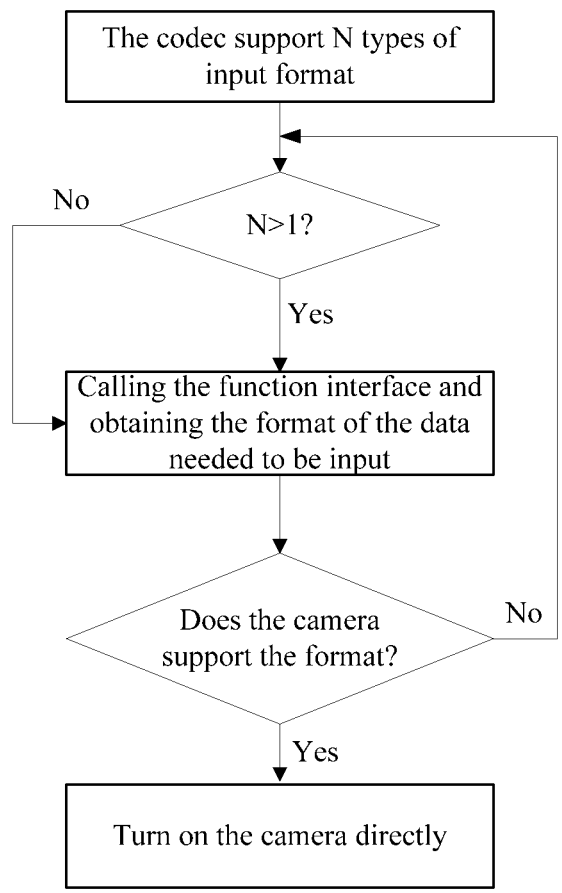
FIG. 12 is a schematic view showing the interaction process between a camera and the encoding and decoding plugin.

In the video communication process, a camera is often used. Since the encoding and decoding plugin can support a plurality of types of input format for performing encoding and decoding, thus, when the camera is turned on, the format of data needed to be input by the encoding and decoding plugin should be detected. As shown in FIG. 12, when the encoding and decoding plugin is scanned and the capability value of the corresponding hardware codec is obtained, the number of the type of the input format supported by the encoding and decoding plugin can be acquired; if the number N of the type of the input format supported by the encoding and decoding plugin is greater than 1, calling the function interface of the encoding and decoding plugin to obtain the format of the current data needed to be input by the encoding and decoding plugin in order and detecting whether the camera supports the current format; if the camera supports the current format, turning on the camera, otherwise returning to the step of calling the function interface again to obtain another format of the data needed to be input by the encoding and decoding plugin and the step of detecting the format, until a format matching with both the encoding and decoding plugin and the camera is found. If the number N of the type of the input format supported by the encoding and decoding plugin is equal to 1, the camera is directly turned on to encode the data. It is to be noted that, if the output format of the camera does not match with the input format of the encoding and decoding plugin, conversion of the format of the data is required (not shown).

Figure 7:
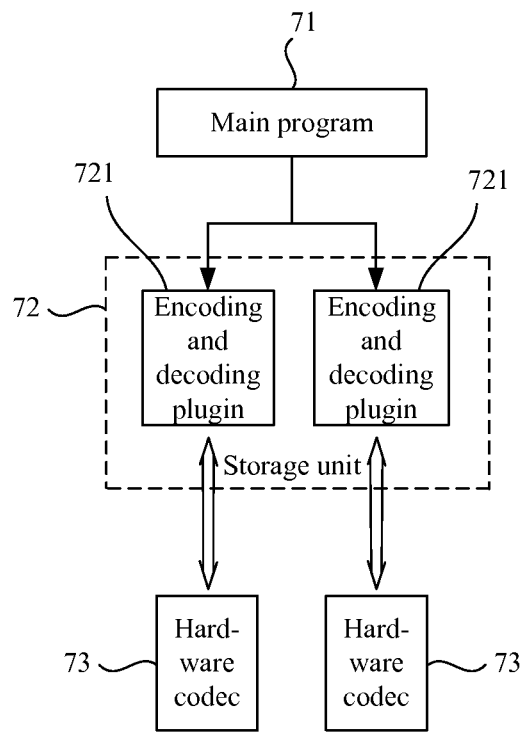
FIG. 7 is a block diagram of a system for automatic adaptation of hardware encoding and decoding in accordance with an embodiment of the present disclosure.

As shown in FIG. 7, which is a block diagram of a system for automatic adaptation of hardware encoding and decoding, the system includes a main program module 71, a storage unit 72, and a hardware codec 73. The hardware codec 73 is integrated in an embedded chip. The storage unit 72 is configured to store at least one encoding and decoding plugin 721 each of which corresponds to a hardware codec 73 and complies with a pre-defined interface. The main program module 71 is configured to import the encoding and decoding plugin 721 and load the corresponding hardware codec 73, thereby encoding or decoding the data.

The encoding and decoding plugin 721 corresponding to the hardware codec 73 as mentioned above is provided by the manufacturer. Each embedded chip is integrated with an interface published by the main program module 71, that is, each encoding and decoding plugin 721 complies with the pre-defined interface to realize the calling of the hardware codec 73. That is, the main program module 71 can load the hardware codec 73 of the corresponding embedded chip by importing the corresponding encoding and decoding plugin 721, which realizes the calling of the hardware codec 73 in the embedded chip and improves the encoding capability and the video quality.

It is to be noted that the device can only perform encoding or decoding according to requirements or perform encoding and decoding in this order, thus, the encoding and decoding plugin is pre-stored according to requirements. In addition, since a plurality of hardware codecs 73 may simultaneously exist (for example, a device is integrated with a plurality of embedded chips and each chip is provided with the hardware codec), a plurality of encoding and decoding plugins 721 may be pre-stored. However, only one single encoding and decoding plugin 721 is imported when the encoding or decoding is being performed, that is, only one single hardware codec 73 performs encoding and decoding at one time, and only after the current encoding or decoding operation is finished, can another encoding and decoding plugin be imported. The data input and output interactions between the encoding and decoding plugin 721 and the main program module can be implemented by a callback function.

Figure 8:
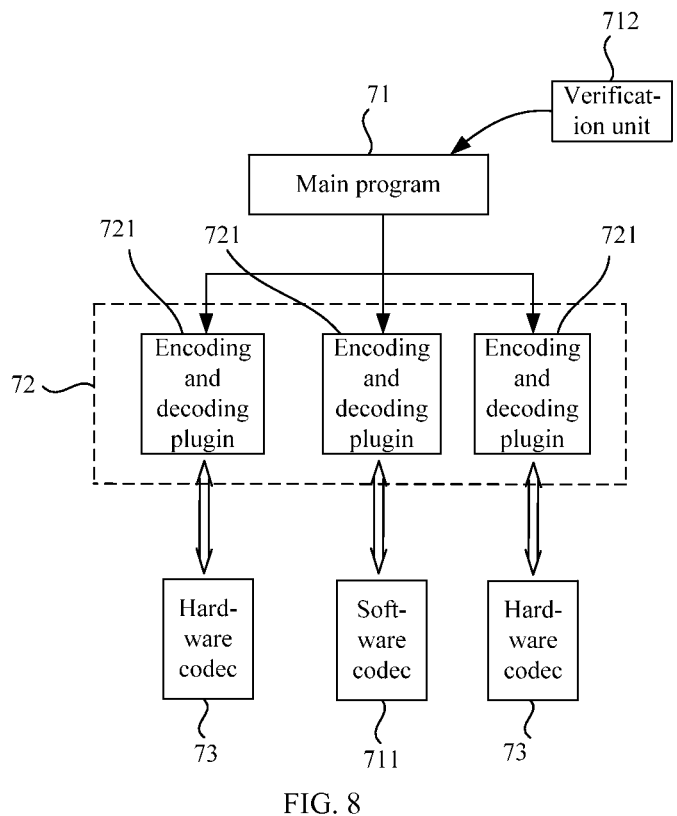
FIG. 8 is a block diagram of another system for automatic adaptation of hardware encoding and decoding in accordance with an embodiment of the present disclosure.

Referring to FIG. 8, which is a block diagram of a system for automatic adaptation of hardware encoding and decoding, compared with the embodiment shown in FIG. 7, the system of the embodiment further includes a software codec 711 except the hardware codec 73. The software codec 711 can be integrated in the main program module 71 and corresponds to a pre-stored encoding and decoding plugin 721. The main program module 71 further includes a verification unit 712.

The software codec 711 is configured to be called for performing encoding and decoding when no suitable hardware codecs 73 are provided. The encoding and decoding plugin of the software codec 711 has the same interface as that of the encoding and decoding plugin of the hardware codec, thus, the encoding and decoding plugin of the software codec 711 is also imported according to conditions and can seamlessly connected to the main program module 71.

The main program module 71 calls the software codec 711 in two situations as follows. In one situation, the device is not provided with the hardware codec 73, at this time the main program module 71 will import the encoding and decoding plugin 721 corresponding to the software codec 711 and perform encoding and decoding via the software codec 711. In another situation, when the video communication is performed, the encoding and decoding capabilities of both communication sides are compared and matched to allow the codecs applied in both communication sides to be identical with each other (that is, maximum image resolution, maximum output code rate, frame rate supported by the codecs used by both communication sides, type of the input image type supported by the encoder, type of the output image, and type of the codec) to allow for the normal implementation of the video communication. And if, although both communication sides are respectively provided with the hardware codecs 73, the hardware codecs 73 do not match with each other, the main program module 71 will import the encoding and decoding plugin 721 corresponding to the software codec 711 and perform encoding and decoding via the software codec 711.

The verification unit 712 is configured to verify each plugin in the storage unit 72 before the main program module 71 imports the plugin. Sometimes due to the reason that the version of the plugin has already been updated, the codec corresponding to the plugin may not be found, and the verification unit 712 can verify the plugin in one or several ways of the three ways including creating the software entity, calling the function interface, and judging whether the scanned plugin has already existed.

Figure 9:
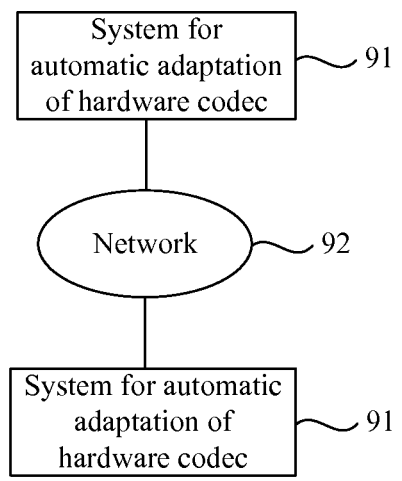
FIG. 9 is a block diagram of a video communication encoding and decoding system in accordance with an embodiment of the present disclosure.

The present disclosure further provides a video communication encoding and decoding system, as shown in FIG. 9, the system includes at least two systems 91 for automatic adaptation of hardware encoding and decoding which are connected via a network 92 (wired or wireless). The systems 91 for automatic adaptation of hardware encoding and decoding can be constructed in terminals to assist the terminals in performing video communication. Particularly, the pre-stored encoding and decoding plugin can be used to call the hardware codec of the embedded chip to encode and decode corresponding data and further to greatly improve the encoding and decoding capability of the system and improve the video communication quality.

Figure 10:
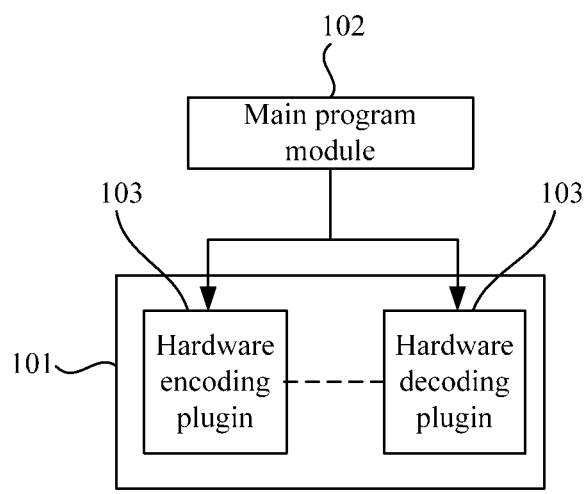
FIG. 10 is a block diagram of a hardware codec calling module in accordance with an embodiment of the present disclosure.

The present disclosure further provides a hardware codec calling module, as shown in FIG. 10, the hardware codec calling module includes a storage unit 101 and a main program module 102. At least one encoding and decoding plugin is stored in the storage unit 101; each hardware codec corresponds to an encoding and decoding plugin 103 and complies with a pre-defined interface such that the encoding and decoding plugin 103 can be imported by the main program module 102. The main program module 102 is configured to import the encoding and decoding plugin 103 stored in the storage unit 101 and further load the corresponding hardware codec. The hardware codec calling module of the present disclosure can be constructed in an embedded device to assist the device in performing encoding and decoding. Since the hardware codec is included in the embedded chip, thus, the hardware codec has a relatively greater encoding and decoding capability; furthermore, the main program module 102 calls the hardware codec using the encoding and decoding plugin 103, which saves the complicated process in which each type of hardware codec is required to encode the source codes in prior art and solves the problem that the management on different platforms are complicated and the compatibility is poor.

Figure 11:
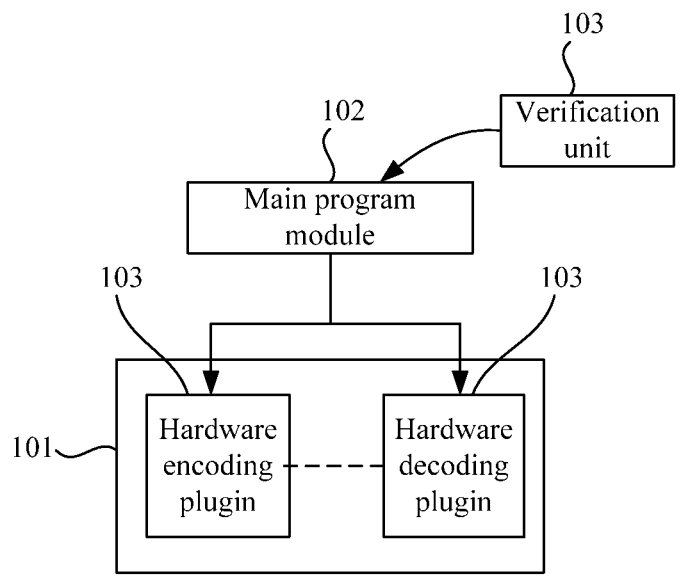
FIG. 11 is a block diagram of a hardware codec calling module in accordance with an embodiment of the present disclosure.

Referring to FIG. 11, which is a block diagram of another hardware codec calling module in accordance with an embodiment of the present disclosure, compared with the embodiment shown in FIG. 10, the main program module 102 of the embodiment is further provided with a verification unit 103. The verification unit 103 is configured to verify each plugin stored in the storage unit 101. Sometimes due to the reason that the version of the plugin has been updated, the codec corresponding to the plugin may not be found, and the verification unit 103 can verify the plugin in one or several ways of the three ways including creating the software entity, calling the function interface, and judging whether the scanned plugin has already existed.

It will be appreciated by those having ordinary skill in the art that all the steps or at least some steps of the above embodiments can be realized by hardware or by instructing hardware by procedures, and all the procedures can be stored in a computer readable storage medium, and the above storage medium can be a read-only memory, a disc or an optical disc, etc.

The foregoing descriptions are only preferred embodiments of the present disclosure and are not intended to limit the present disclosure. Any modification, equivalent replacement and improvement made under the spirit and principle of the present disclosure should be included in the protection scope thereof.

What is claimed is:

1. A method for automatic adaptation of hardware encoding and decoding, comprising:
   pre-storing, by an embedded device comprising a hardware codec, at least one encoding and decoding plugin each of which corresponds to the hardware codec and complies with a pre-defined interface;
   importing, by the embedded device, the encoding and decoding plugin and loading the corresponding hardware codec; and
   encoding or decoding, by the embedded device, corresponding data.

2. The method of claim 1, further comprising the following step before importing the encoding and decoding plugin and loading the corresponding hardware codec:
   verifying, by the embedded device, the encoding and decoding plugin.

3. The method of claim 2, wherein verifying the encoding and decoding plugin comprises at least one of the following:
   creating a software entity;
   calling a function interface; and
   determining whether a scanned encoding and decoding plugin has already existed.

4. The method of claim 1, wherein encoding or decoding corresponding data comprises:
   implementing, by a callback function, data input and output interactions between the encoding and decoding plugin and a main program.

5. The method of claim 4, wherein implementing data input and output interactions between the encoding and decoding plugin and a main program comprises:
   registering, by the main program, the callback function to the encoding and decoding plugin via a defined interface;
   storing, by the encoding and decoding plugin, the callback function;
   receiving, by the main program, data to be encoded and decoded;
   calling, by the encoding and decoding plugin, an encoding and decoding function;
   if a data space is required for performing encoding and decoding, the encoding and decoding plugin calling the callback function and applying to the main program for the data space;
   applying, by the main program, for the data space for the encoding and decoding plugin; and
   calling the callback function to return to the main program after the encoding and decoding operation is finished.

6. A video communication encoding and decoding method implemented by a hardware codec of an embedded device, comprising:
   pre-storing at least one encoding and decoding plugin each of which corresponds to the hardware codec and complies with a pre-defined interface;
   scanning the pre-stored encoding and decoding plugin and obtaining a capability value of the hardware codec corresponding to the encoding and decoding plugin according to a plugin interface;

comparing capability values of hardware codecs of both communication sides;

importing needed encoding and decoding plugin according to the comparison result and loading the corresponding hardware codec; and encoding or decoding corresponding data.

7. The method of claim 6, further comprising:

pre-setting a software codec corresponding to one pre-stored encoding and decoding plugin; and loading the software codec when both communication sides are not provided with corresponding encoding and decoding plugins and encoding or decoding the data.

8. The method of claim 6, wherein scanning the pre-stored encoding and decoding plugin and obtaining a capability value of the hardware codec corresponding to the encoding and decoding plugin according to a plugin interface comprises:

verifying the scanned encoding and decoding plugin.

9. The method of claim 8, wherein verifying the scanned encoding and decoding plugin comprises:

creating a software entity;

calling a function interface; and judging whether the scanned encoding and decoding plugin has already existed.

10. The method of claim 6, wherein encoding or decoding corresponding data comprises:

implementing, by a callback function, data input and output interactions between the encoding and decoding plugin and a main program.

11. The method of claim 10, wherein implementing data input and output interactions between the encoding and decoding plugin and a main program comprises:

registering, by the main program, the callback function to the encoding and decoding plugin via a defined interface;

storing, by the encoding and decoding plugin, the callback function;

receiving, by the main program, data needed to be encoded and decoded;

calling, by the encoding and decoding plugin, an encoding and decoding function;

if a data space is required for performing the encoding and decoding, the encoding and decoding plugin calling the callback function and applying to the main program for the data space;

applying, by the main program, for the data space for the encoding and decoding plugin; and calling the callback function to return to the main program after the encoding and decoding operation is finished.

12. A system for automatic adaptation of hardware encoding and decoding, comprising:

a hardware codec integrated in an embedded chip;

a storage unit configured to store at least one encoding and decoding plugin each of which corresponds to the hardware codec and complies with a pre-defined interface; and a main program module configured to import the encoding and decoding plugin, load the corresponding hardware codec, and encode or decode corresponding data.

13. The system of claim 12, wherein the main program module further comprises a software codec, the main program module loads the software codec to encode or decode the data when both communication sides are not provided with corresponding hardware codecs, and the software codec corresponds to one pre-stored encoding and decoding plugin.

14. The system of claim 12, the main program module further comprises a verification unit configured to verify the encoding and decoding plugin.

15. The system of claim 12, wherein data input and output interactions between the encoding and decoding plugin and the main program module are implemented by a callback function.

* * * * *